(12) United States Patent
Thubert et al.

(10) Patent No.: US 10,812,388 B2
(45) Date of Patent: Oct. 20, 2020

(54) PREVENTING DAMAGE TO FLOWS IN AN SDN FABRIC BY PREDICTING FAILURES USING MACHINE LEARNING

(71) Applicant: Cisco Technology, Inc., San Jose, CA (US)

(72) Inventors: Pascal Thubert, La Colle sur Loup (FR); Jean-Philippe Vasseur, Saint Martin d'uriage (FR); Eric Levy-Abegnoli, Valbonne (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/269,723

(22) Filed: Feb. 7, 2019

(65) Prior Publication Data

US 2020/0259746 A1 Aug. 13, 2020

(51) Int. Cl.
  *H04L 12/803* (2013.01)
  *H04L 12/24* (2006.01)
  *H04L 12/715* (2013.01)
  *H04L 12/851* (2013.01)

(52) U.S. Cl.
  CPC ............ *H04L 47/122* (2013.01); *H04L 41/16* (2013.01); *H04L 45/64* (2013.01); *H04L 47/2483* (2013.01)

(58) Field of Classification Search
  None
  See application file for complete search history.

(56) References Cited

U.S. PATENT DOCUMENTS

| | | | |
|---|---|---|---|
| 2003/0007453 A1* | 1/2003 | Ogier | H04L 47/17 370/229 |
| 2003/0058871 A1* | 3/2003 | Sastry | H04L 47/522 370/401 |
| 2013/0010610 A1 | 1/2013 | Karthikeyan et al. | |
| 2015/0195192 A1 | 7/2015 | Vasseur et al. | |
| 2015/0222557 A1* | 8/2015 | Bhattacharya | H04L 41/00 370/237 |

(Continued)

FOREIGN PATENT DOCUMENTS

| | | |
|---|---|---|
| EP | 2871803 B1 | 12/2017 |
| EP | 3039817 B1 | 4/2018 |

OTHER PUBLICATIONS

Leiserson, C.E., "Fat-trees: Universal networks for hardware-efficient supercomputing", IEEE Transactions on Computers, vol. C-34, No. 10, pp. 892-901, Oct. 1985, IEEE.

(Continued)

*Primary Examiner* — Yaotang Wang
(74) *Attorney, Agent, or Firm* — Behmke Innovation Group LLC; Kenneth J. Heywood; Jonathan P. Western

(57) ABSTRACT

In one embodiment, a supervisory device for a software defined networking (SDN) fabric predicts a failure in the SDN fabric using a machine learning-based failure prediction model. The supervisory device identifies a plurality of traffic flows having associated leaves in the SDN fabric that would be affected by the predicted failure. The supervisory device selects a subset of the identified plurality of traffic flows and their associated leaves. The supervisory device disaggregates routes for the selected subset of traffic flows and their associated leaves, to avoid the predicted failure.

20 Claims, 16 Drawing Sheets

(56) References Cited

U.S. PATENT DOCUMENTS

| | | | | |
|---|---|---|---|---|
| 2015/0317197 | A1* | 11/2015 | Blair | G06N 7/005 714/47.3 |
| 2016/0072714 | A1* | 3/2016 | Gan | H04L 41/00 709/238 |
| 2017/0048137 | A1* | 2/2017 | Shanmugalingam | H04L 45/64 |
| 2017/0070387 | A1* | 3/2017 | Rao | H04L 41/0816 |

OTHER PUBLICATIONS

Onisick, Joe., "Data Center Bridging", http://www.definethecloud.net/data-center-bridging/, 4 pages, Mar. 12, 2010., Define the Cloud.

Patton, Diane., "Converge your network with priority flow control (PFC)", https://cumulusnetworks.com/blog/priority-flow-control/, 4 pages, Jun. 23, 2017., Cumulus Networks, Inc.

Przygienda, et al., "RIFT: Routing in Fat Trees", RIFT Working Group—Internet-Draft, <draft-ietf-rift-rift-02>, 88 pages, Jun. 21, 2018., IETF Trust.

Yuan, et al., "On Nonblocking Folded-Clos Networks in Computer Communication Environments", 2011 IEEE International Parallel & Distributed Processing Symposium, Anchorage, AK, pp. 188-196, 2011, IEEE.

Zhu, et al., "Congestion Control for Large-Scale RDMA Deployments", SIGCOMM '15, Aug. 17-21, 2015, London, United Kingdom., pp. 523-536, 2015, ACM.

Zhu, et al., "ECN or Delay: Lessons Learnt from Analysis of DCQCN and TIMELY", CoNEXT '16, Dec. 12-15, 2016, Irvine, CA, USA., 15 pages, 2016, ACM.

\* cited by examiner

PREVENTING DAMAGE TO FLOWS IN AN SDN FABRIC BY PREDICTING FAILURES USING MACHINE LEARNING

TECHNICAL FIELD

The present disclosure relates generally to computer networks, and, more particularly, to preventing damage to flows in a software defined networking (SDN) fabric by predicting failures using machine learning.

BACKGROUND

Software defined networking (SDN) represents an evolution of computer networks away from a decentralized architecture to one of centralized, software-based control. More specifically, in traditional computer networks, the control plane (e.g., selection of the routing path) and the data plane (e.g., forwarding packets along the selected path) are intertwined, with control plane decisions being made in a decentralized manner via signaling between the networking devices. In contrast, control plane decisions in an SDN-based network architecture are made by a centralized controller and pushed to the networking devices, as needed.

While applicable to any number of different types of network deployments, SDN is particularly of relevance to cloud service provider networks. Indeed, in a traditional client-server architecture, the network need only support traffic between the client and the server. However, with cloud computing, each transaction with a client may result in a large amount of "east-west" traffic between nodes in the cloud (e.g., to perform a query or computation in parallel, etc.), as well as the traditional "north-south" traffic between the cloud and the client. In addition, the very nature of cloud computing environments allows for the rapid scaling of resources with demand, such as by spinning new nodes up or down. In such situations, centralized control over the control plane results in better network performance over that of decentralized control.

While SDN fabrics offer certain advantages over traditional networking approaches, their reliance on equal-cost multipath routing (ECMP) also make SDN fabrics particularly susceptible to packet loss in the event of failures.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
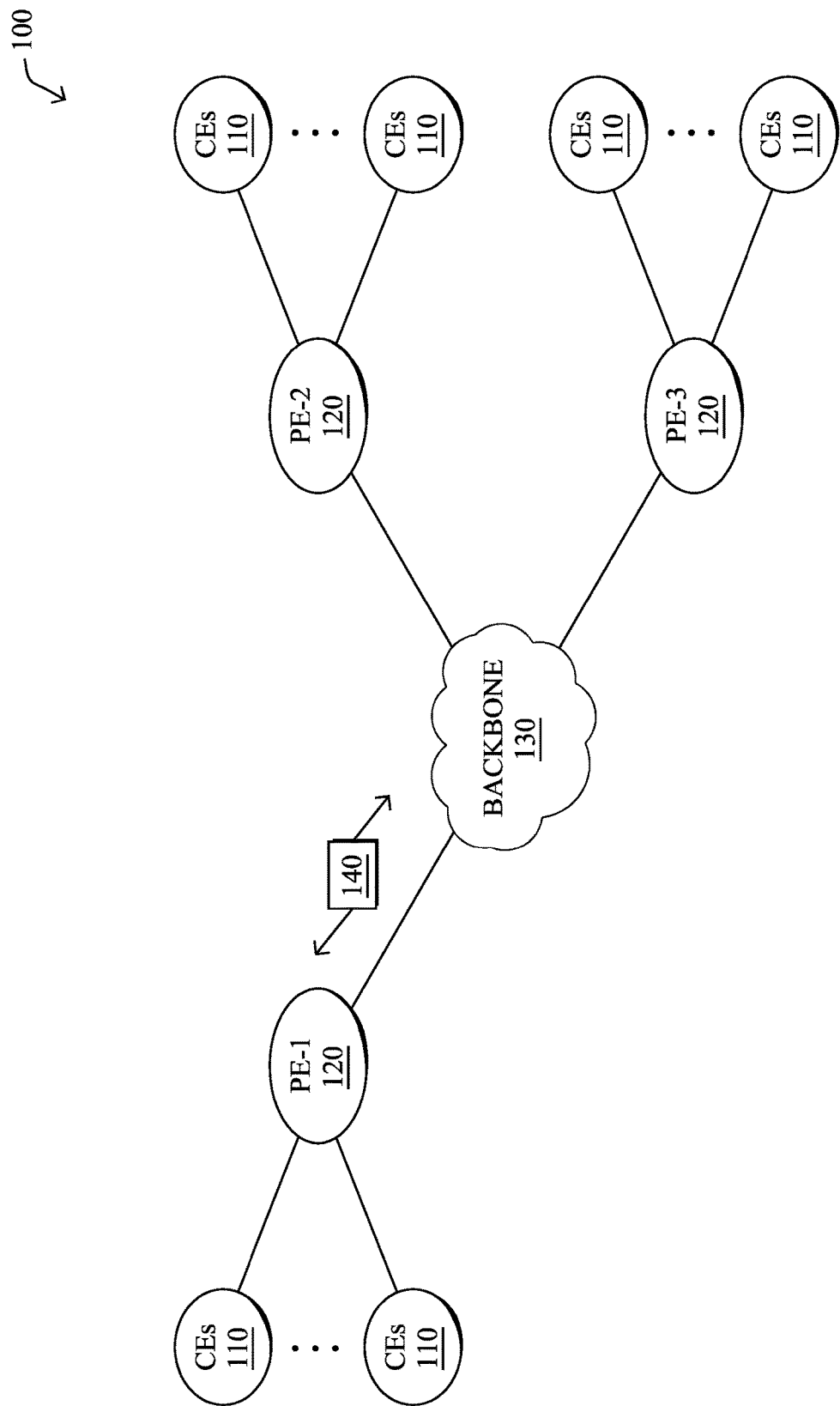
FIGS. 1A-1B illustrate an example computer network.

According to one or more embodiments of the disclosure, a supervisory device for a software defined networking (SDN) fabric predicts a failure in the SDN fabric using a machine learning-based failure prediction model. The supervisory device identifies a plurality of traffic flows having associated leaves in the SDN fabric that would be affected by the predicted failure. The supervisory device selects a subset of the identified plurality of traffic flows and their associated leaves. The supervisory device disaggregates routes for the selected subset of traffic flows and their associated leaves, to avoid the predicted failure

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
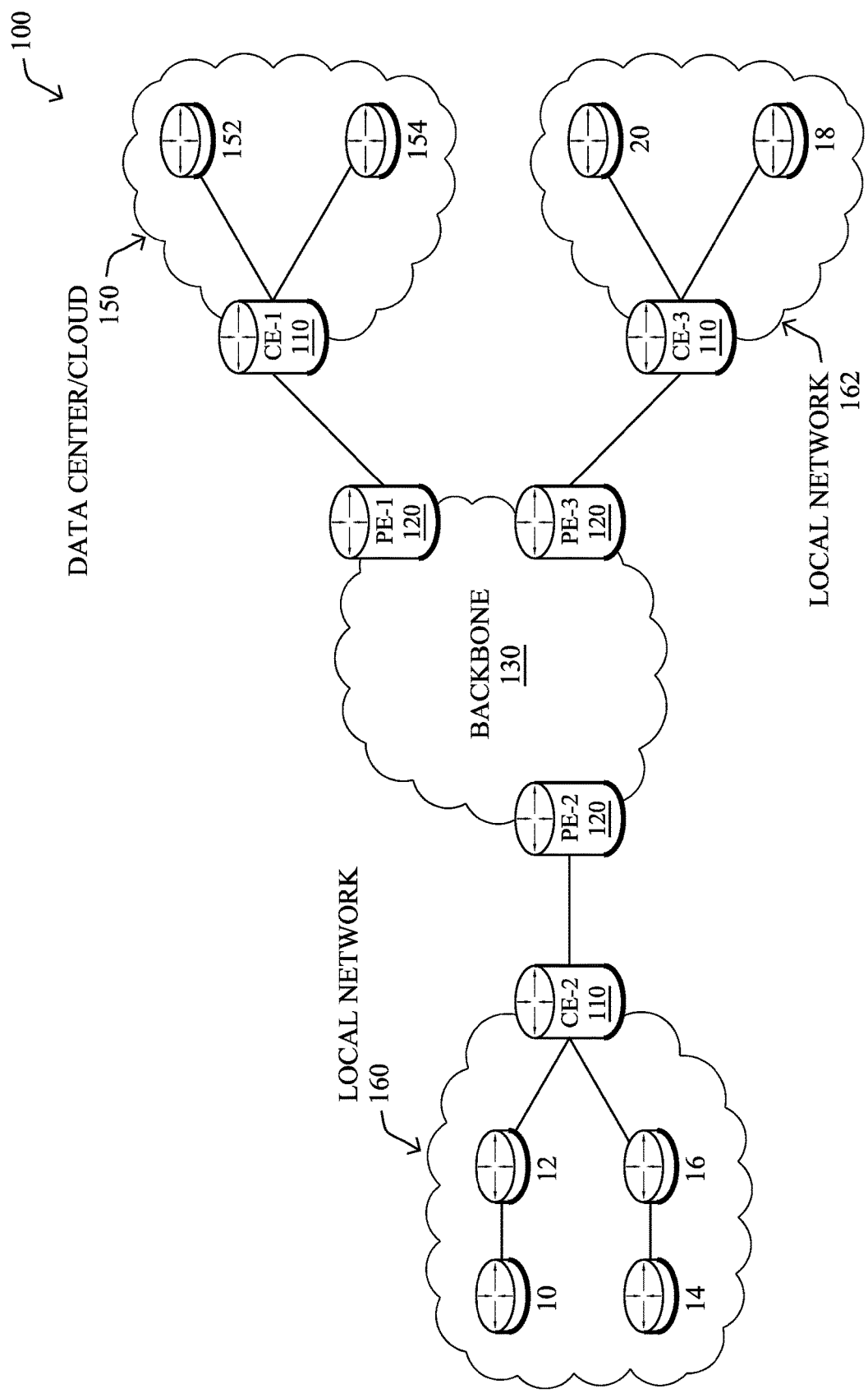

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
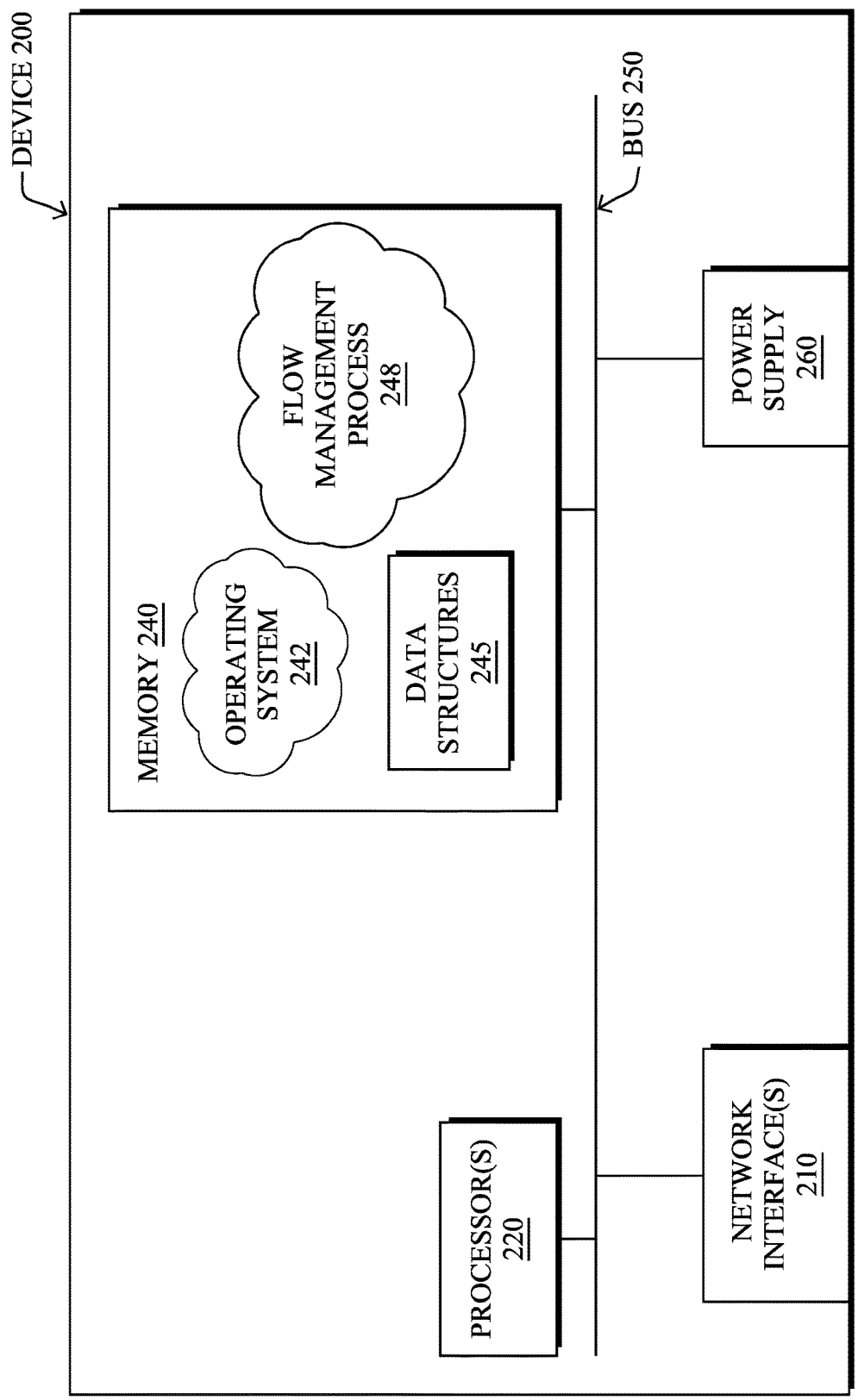
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a flow management process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, flow management process 248 may execute one or more machine learning-based models to predict failure points in the network and, in turn, adjust the traffic flows in the network, accordingly. Flow management process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, flow management process 248 can use the model M to classify new data points, such as information regarding new traffic flows in the network. Often, M is a statistical model, and the cost function is inversely proportional to the likelihood of M, given the input data.

In various embodiments, flow management process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "normal," or a "failure precursor." On the other end of the spectrum are unsupervised techniques that do not require a training set of labels. Notably, while a supervised learning model may look for previously seen patterns that have been labeled as such, an unsupervised model may instead look to whether there are changes in the behavior of the network traffic over time. Semi-supervised learning models take a middle ground approach that uses a greatly reduced set of labeled training data.

Example machine learning techniques that flow management process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted there to be a failure within a network fabric. Conversely, the false negatives of the model may refer to the number of times the model incorrectly predicted normal operation of the network, when a failure actually resulted. True negatives and positives may refer to the number of times the model correctly predicted either normal behavior or a failure, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, software defined networking (SDN) represents an evolution of computer networks that centralizes control plane decisions with a supervisory device. For example, in Application Centric Infrastructure (ACI), an SDN-based architecture from Cisco Systems, Inc., control plane decisions may be made by a centralized APIC. However, even with centralized control, there still exists the potential for seasonal congestion to occur on certain links in the network fabric.

In general, an SDN-based network fabric may utilize a leaf-spine architecture, such as CLOS and Fat-Tree architectures. This is particularly true in the case of data center and cloud networks that are poised to deliver the majority of computation and storage services in the future. In a Fat-Tree, nodes are organized in a tree structure with branches becoming 'fatter' towards the top of the hierarchy. In the context of computer networks, this increasing 'fatness' typically corresponds to increasing bandwidth towards the top of the hierarchy. CLOS networks typically involve multiple stages (e.g., an ingress stage, a middle stage, and an egress stage), with 'crossbar' switches at different stages that are interwoven such that multiple paths are available for switching, so that one traffic flow does not block another.

As would be appreciated, an SDN fabric that implements a leaf-spine architecture may operate by emulating a very large switch by interleaving many smaller switches, resulting in much lower cost and higher scalability. The benefits of such designs include, but are not limited to, the availability of an equal cost multi-path (ECMP) based switching fabric, a simplified network, and fully utilized link bandwidth on each network node. It also allows the networks to scale and grow incrementally, on demand. Cisco's next generation SDN based data center network fabric architecture, ACI, is also based on CLOS design principles.

Figure 3A:
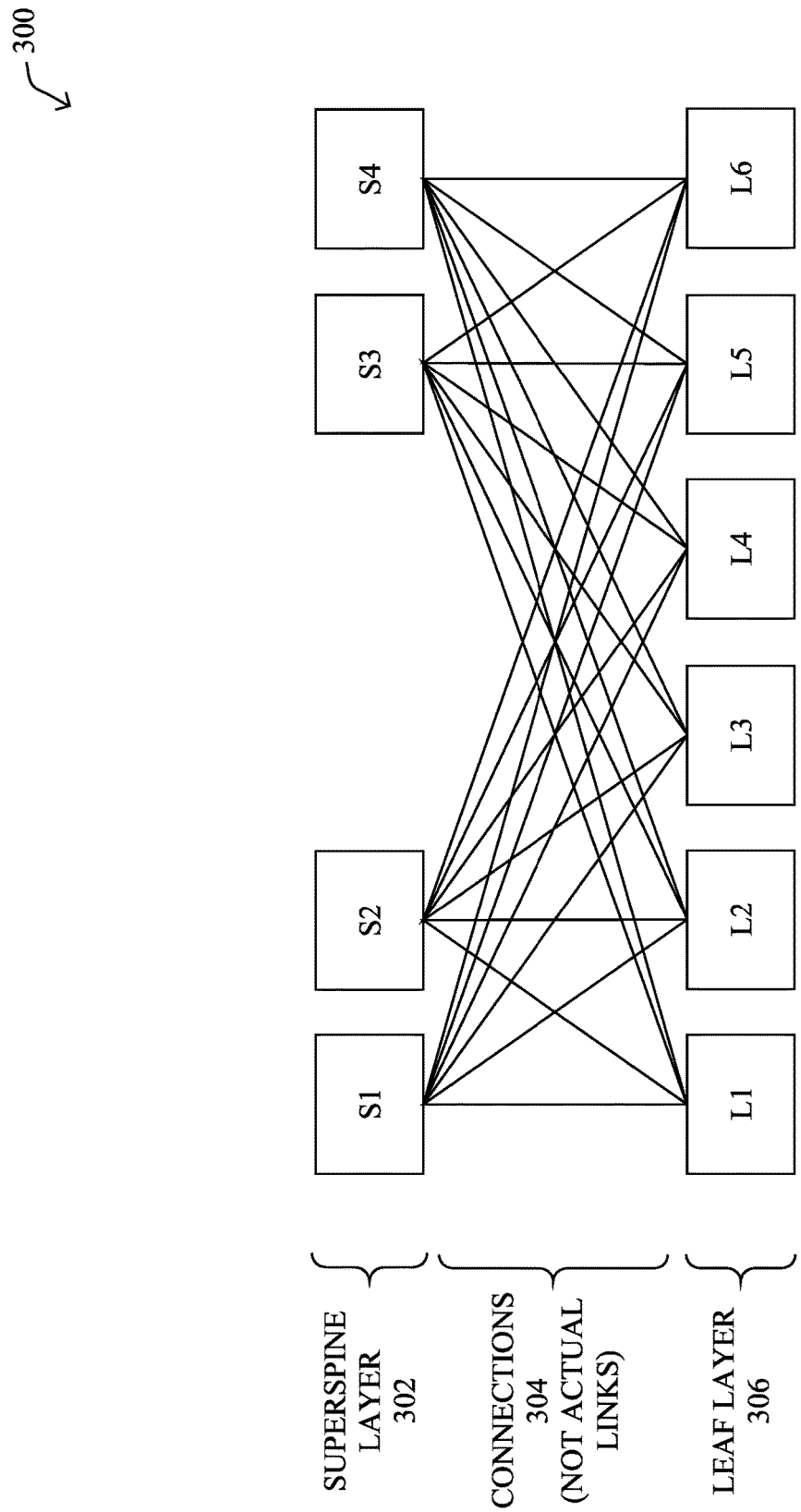
FIGS. 3A-3E illustrate examples of software defined networking (SDN) fabric implementations.

FIG. 3A illustrates a simplified example of an SDN fabric 300 that uses a leaf-spine architecture. As shown, the network switches S1-S4 and L1-L6 may be organized according to CLOS design principles. In particular, switches S1-S4 may form a superspine 302. This layer is also sometimes called the Top of Fabric (ToF) layer, such as in RIFT. At the south of fabric 300 is a leaf layer 306 that comprises switches L1-L6 and provide connectivity to the various clients of fabric 300, such as endpoints or virtual machines (VMs), and implement Layer 2 bridging and Layer 3 routing functions. Likewise, S1-S4 in superspine layer 302 may be fully meshed with L1-L6 in leaf layer 306 via connections 304, which are not actual links, in the physical sense. During operation, S1-S4 may provide redundant paths and connectivity from a previous lower-level stage switch in the network fabric.

Figure 3B:
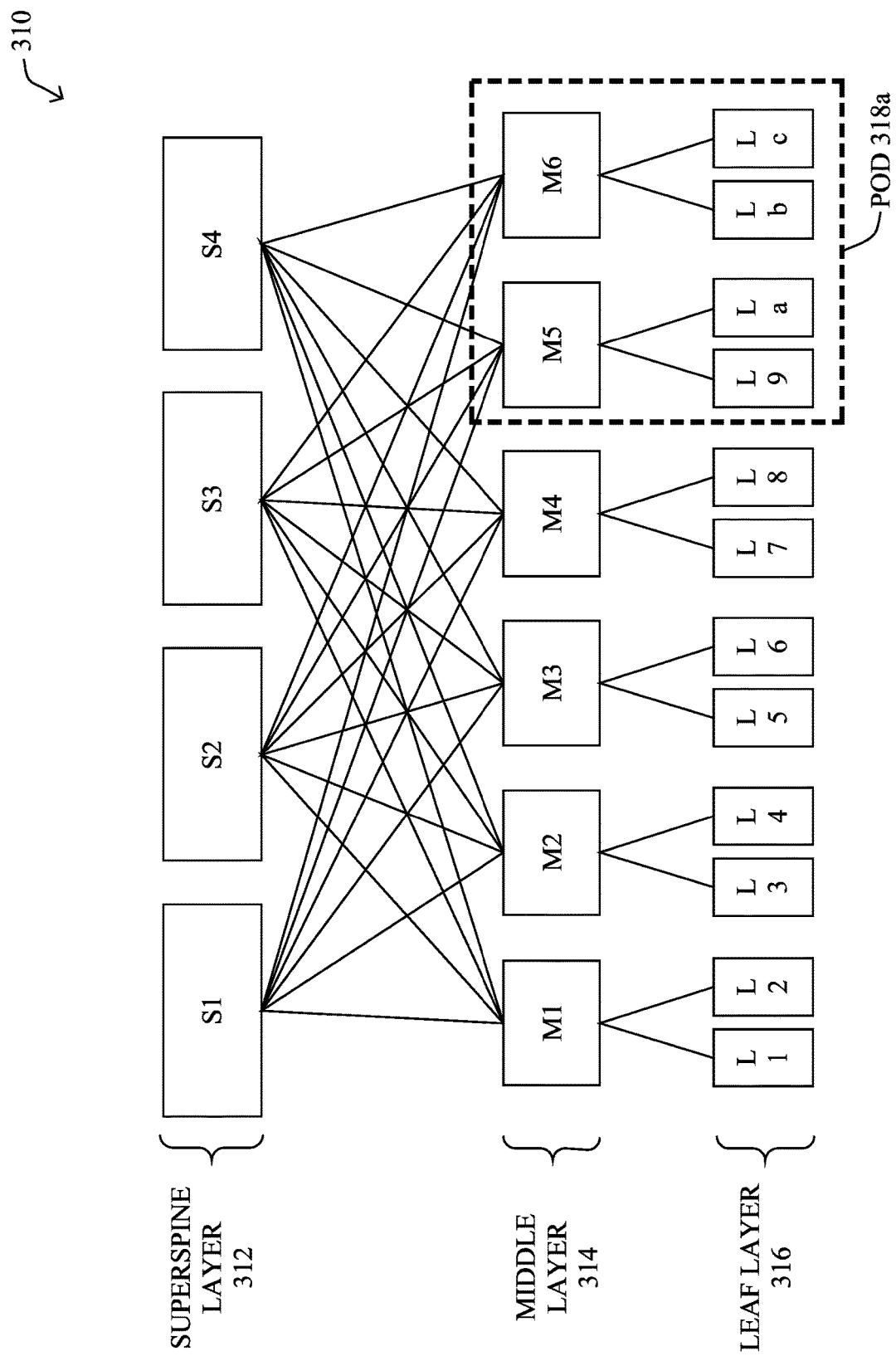

FIG. 3B illustrates another example SDN fabric 310 that uses a CLOS-based approach. As shown, at the top of fabric 310 are switches S1-S4 that form a superspine layer 312 that are connected to a middle layer 314 comprising switches M1-M6 which are, in turn, connected to a leaf layer 316 comprising switches L1-Lc. The overall function of fabric 310 may be similar to that of fabric 300 in FIG. 3A, with the addition of middle layer 314 that may perform, for example, aggregation functions. Leaf switches and their corresponding switches in middle layer 314 may also form pods, such as pod 318a shown.

Today, a large, virtualized data center fabric might be comprised of approximately 500-1000 leaf switches and as many as approximately 8-16 spine switches servicing many of its tenant's virtual networks on the shared, physical network infrastructure. Each leaf switch, in turn, may be connected to between 32-98 physical hypervisor servers, with each server hosting approximately 20 virtual servers/endpoints that estimate to between 1000-2000 endpoints connected per leaf switch. In such a shared network deployment, network access security becomes an important factor for consideration.

More specifically, in virtualized data center deployments, like ACI, the movement of endpoints from one leaf port to another, or from one endpoint group (typically tied to the dot1q VLAN the vSwitch tags to outgoing packets) to another within the same leaf or across leaf switches of the network fabric, is very common. In such loosely-coupled network connectivity models, where the locality of the endpoints is not fixed, the network fabric and the endpoints become vulnerable to attacks by the rogue devices. For example, if the initial network access or the subsequent endpoint moves are allowed without any verification, it might lead to severe security issues. This enforces an important requirement on the underlying first hop switches that are responsible for network connectivity: to grant network access only to authorized endpoints and deny connectivity to unauthorized devices.

To limit the number of ports per leaf switch, leaves are grouped in pods, such as pod 318a. As would be appreciated a pod in an SDN fabric is a cross bar of smaller switches and can be seen as a large, virtual leaf node, characterized by its Radix.

Figure 3C:
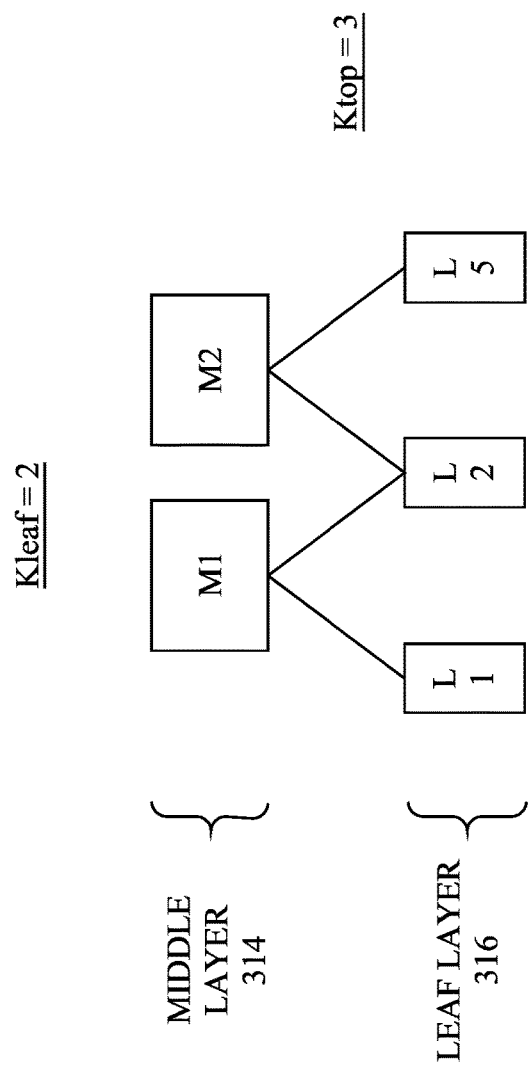

FIG. 3C illustrates an example pod 318 that can be formed by linking switches in middle layer 314 with those in leaf layer 316. As shown, pod 318 has (K=Radix/2) ports connecting upward and as many downward, with Kleaf=2 top nodes of Ktop ports down connected to Ktop leaves with Kleaf ports upward. This creates a virtual leaf node of (Kp=Kleaf*Ktop) ports. From there, pods of pods can be constructed recursively within the SDN fabric.

A Fat-Tree has a number of pods interconnected by a superspine. In an ideal fabric, there is at least one port per Top of Pod (ToP) switch on every Top-of-Fabric (ToF) switch in the superspine. This means that every northbound port of a leaf has a path to every spine node. In that case, the superspine is fully meshed with the pod top switches, and the fabric is NOT partitioned. For example, in FIG. 3B, assume that M1-M2 and M3-M4 in middle layer 314 also form pods with pod 318a. In such a case, the network would not be considered partitioned, as each of the pods is fully meshed with superspine layer 312.

In the case in which each pod is fully connected to superspine layer 312, a spine node has a Radix (number of ports) Rs=Np*Kleaf, where Np is the number of pods. This makes the connectivity from any spine node to any leaf node resilient to Kleaf−1 breakages in between. However, Rs rapidly becomes a gating factor for scalability, limiting the number of pods that can be attached to the superspine, in many implementations.

Figure 3D:
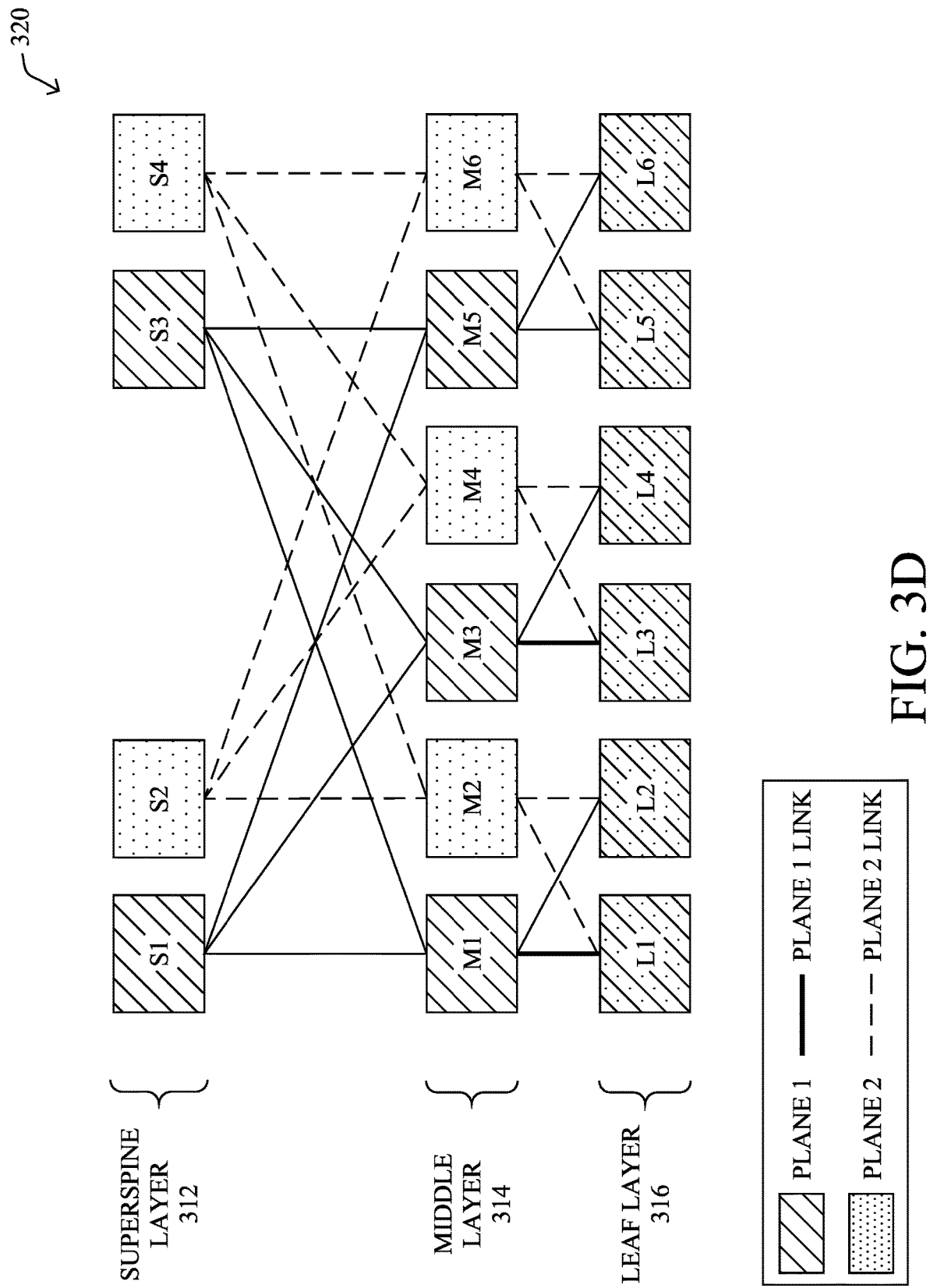

In large fabric, or fabrics built from switches with a low Radix, the ToF is often partitioned in planes. FIG. 3D illustrates an example SDN fabric 320 in which the fabric is partitioned into two separate planes: Plane 1 and Plane 2. As shown, while each ToF switch in superspine layer 312 is still connected to each leaf in leaf layer 316, not every ToF switch in superspine layer is connected to every ToP switch in middle layer 314. This means that the redundancy is reduced, in comparison to non-partitioned fabrics.

Figure 3E:
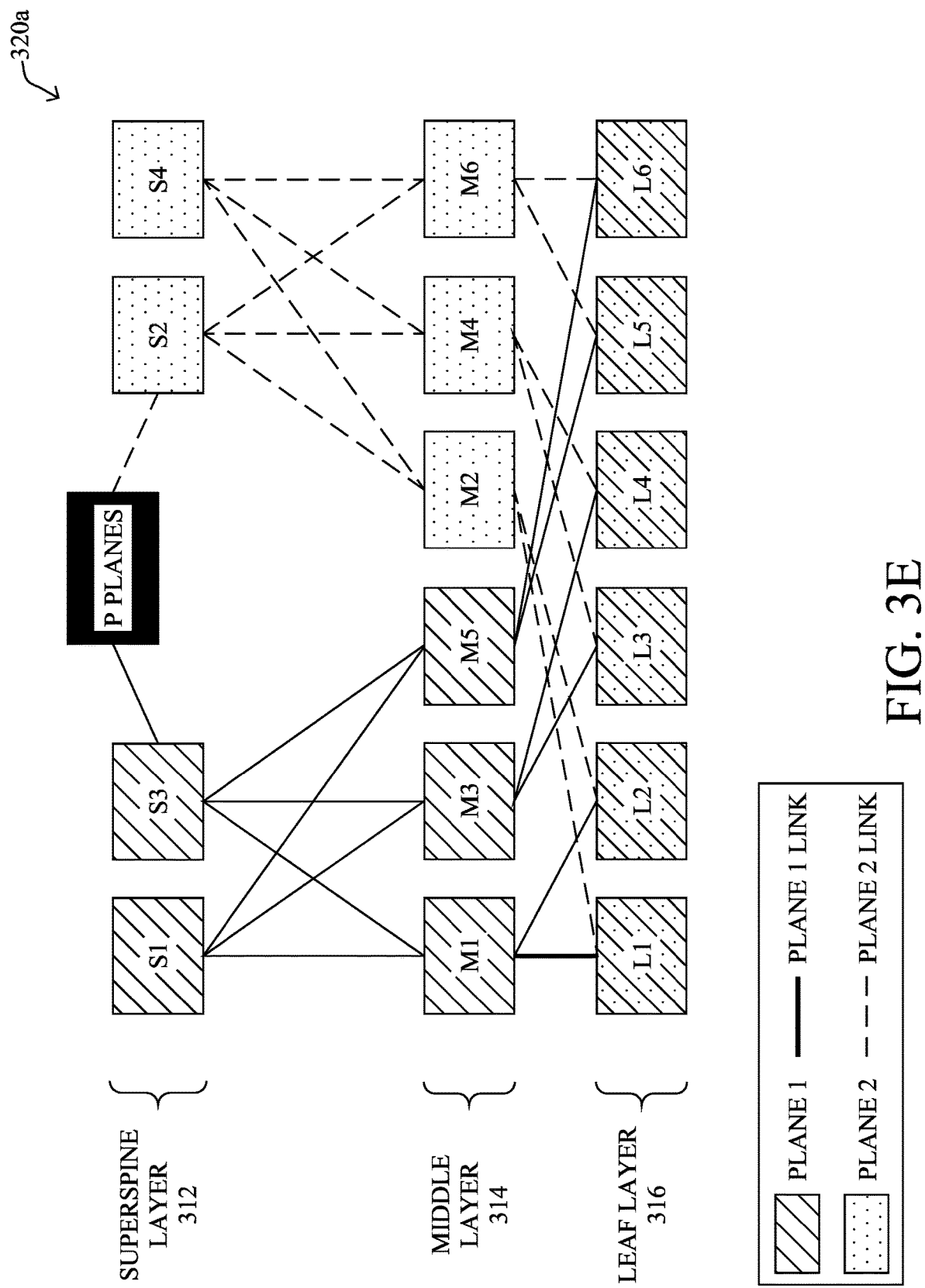

FIG. 3E illustrates another example SDN fabric 320a in which the fabric has been partitioned into P+2 number of planes: plane 1, plane 2, and P-number of other planes. As would be appreciated, the decision as to which plane to use in SDN fabric 320a is left to the leaves in leaf layer 316. In addition, a failure of an intermediate link or switch typically affects one or more planes, but not all.

The minimum connectivity for an SDN fabric, such as fabric 320a, is when each leaf in leaf layer 316 has a single path to each node in superspine layer 312, which happens when every ToF node connects to only one ToP node in each pod. This means that, at a maximum, there are exactly as many planes as there are northbound ports on a leaf Node (Kleaf=P*R). In that case, the ToF is maximally partitioned.

A failure in a link or switch of a partitioned SDN fabric causes an unbalance of capacity between planes. Depending on the redundancy factor, this can be an unbalance of throughput capacity, or a difference of reachability, with some destinations being reachable only via certain planes. This defeats the equal cost multipath (ECMP) load balancing operation by which the ingress leaf selects the next hop, and thus a plane, on a per packet base. Depending on the ECMP operation, all flows may be lightly affected, or a subset of flows may be more significantly affected.

As used herein, a "fallen leaf" refers to a leaf that can be reached only by a subset of ToF nodes in the superspine layer, but cannot be reached by all, due to missing connectivity. If R is the redundancy factor, then it takes at least R breakages to reach a fallen leaf situation. In a fully partitioned fabric, the redundancy factor R is 1, so any breakage may cause one or more fallen leaves. In a general case, with R or more breakages, some spine nodes may be isolated from some leaf nodes.

Figure 4A:
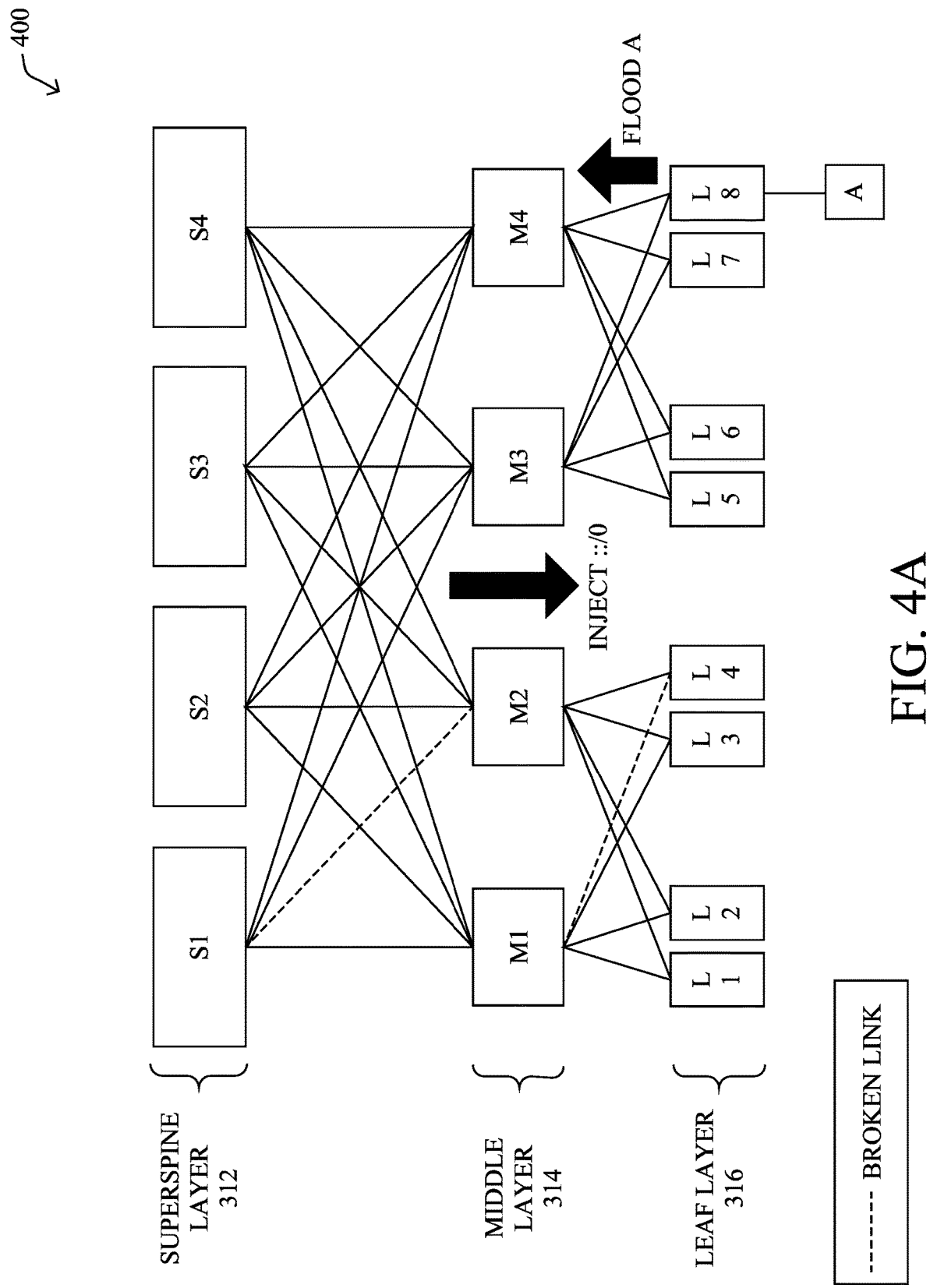
FIGS. 4A-4D illustrates examples of disaggregation and failures in an SDN fabric.

FIG. 4A illustrates an example SDN fabric 400 exhibiting a fallen leaf scenario. As shown, assume that the link between leaf L4 in leaf layer 316 and M1 in middle layer 314 has failed. Similarly, the link between S1 in superspine layer 312 and M2 in middle layer 314 has also failed. In such a case, spine node S1 is completely isolated from fallen leaf L4.

In a routing protocol like RIFT, leaves in leaf layer 316 only see a default route north (e.g., towards superspine layer 312) using a distance vector advertisement. In contrast, the ToF nodes in superspine layer 312 get the full view south (e.g., towards leaf layer 316) using link state flooding, as shown. In the fallen leaf scenario shown, floodings regarding fallen leaf L4 do not reach S1. This means that S1 cannot forward packets to prefix A that is attached to L4.

In RIFT, disaggregation is the process by which nodes transmit southward exceptions to the default route. For example, all nodes at L1 can use all spine nodes in superspine layer 312 as default routers, with the exception of S1 when reaching for A.

One consequence of the fallen leaf problem is that some prefixes attached to the fallen leaf become unreachable from some of the ToF nodes. RIFT proposes two methods to address this issue: positive and the negative disaggregation. Both methods flood so called South Topology Information Elements (S-TIEs) to advertise the impacted prefix(es).

When used for the operation of disaggregation, a positive S-TIE, as usual, indicates reachability to a prefix of given length and all addresses subsumed by it. In contrast, a negative route advertisement indicates that the origin cannot route to the advertised prefix.

Figure 4B:
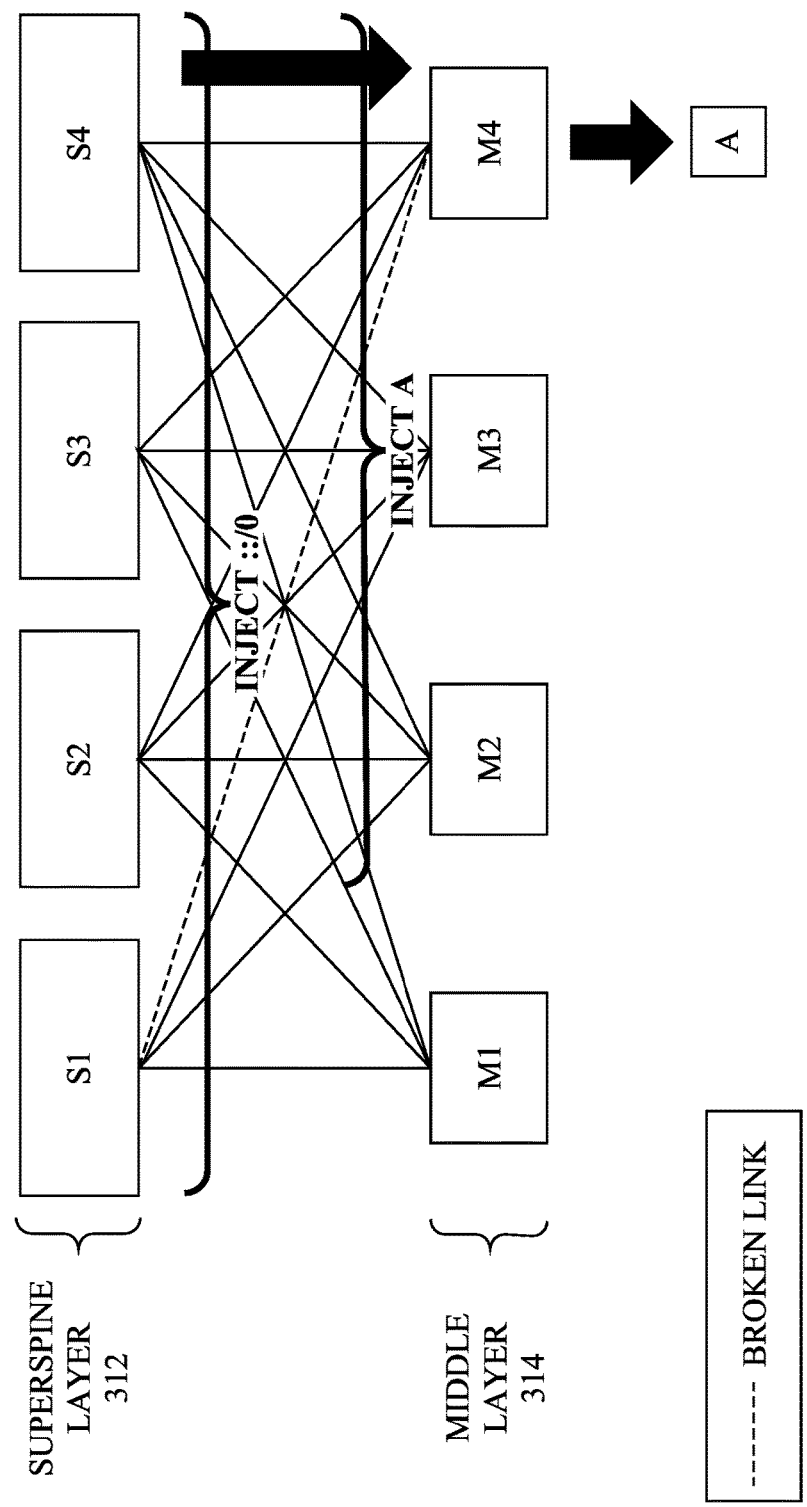

The positive disaggregation is originated by a router that can still reach the advertised prefix, and the operation is not transitive, meaning that the receiver does not generate its own flooding south as a consequence of receiving positive disaggregation advertisements from a higher-level node. The effect of a positive disaggregation is that the traffic to the impacted prefix will follow the prefix longest match and will be limited to the northbound routers that advertised the more specific route. FIG. 4B illustrates an example 410 of positive disaggregation, in the case in which prefix A is not reachable by S1, due to a broken link.

In contrast, negative disaggregation is transitive, and is propagated south, when all the possible routes northwards are barred. A negative route advertisement is only actionable when the negative prefix is aggregated by a positive route advertisement for a shorter prefix. In that case, the negative advertisement carves an exception to the positive route in the routing table, similar to "punching a hole," making the positive prefix reachable through the originator with the special consideration of the negative prefix removing certain next hop neighbors.

Figure 4C:
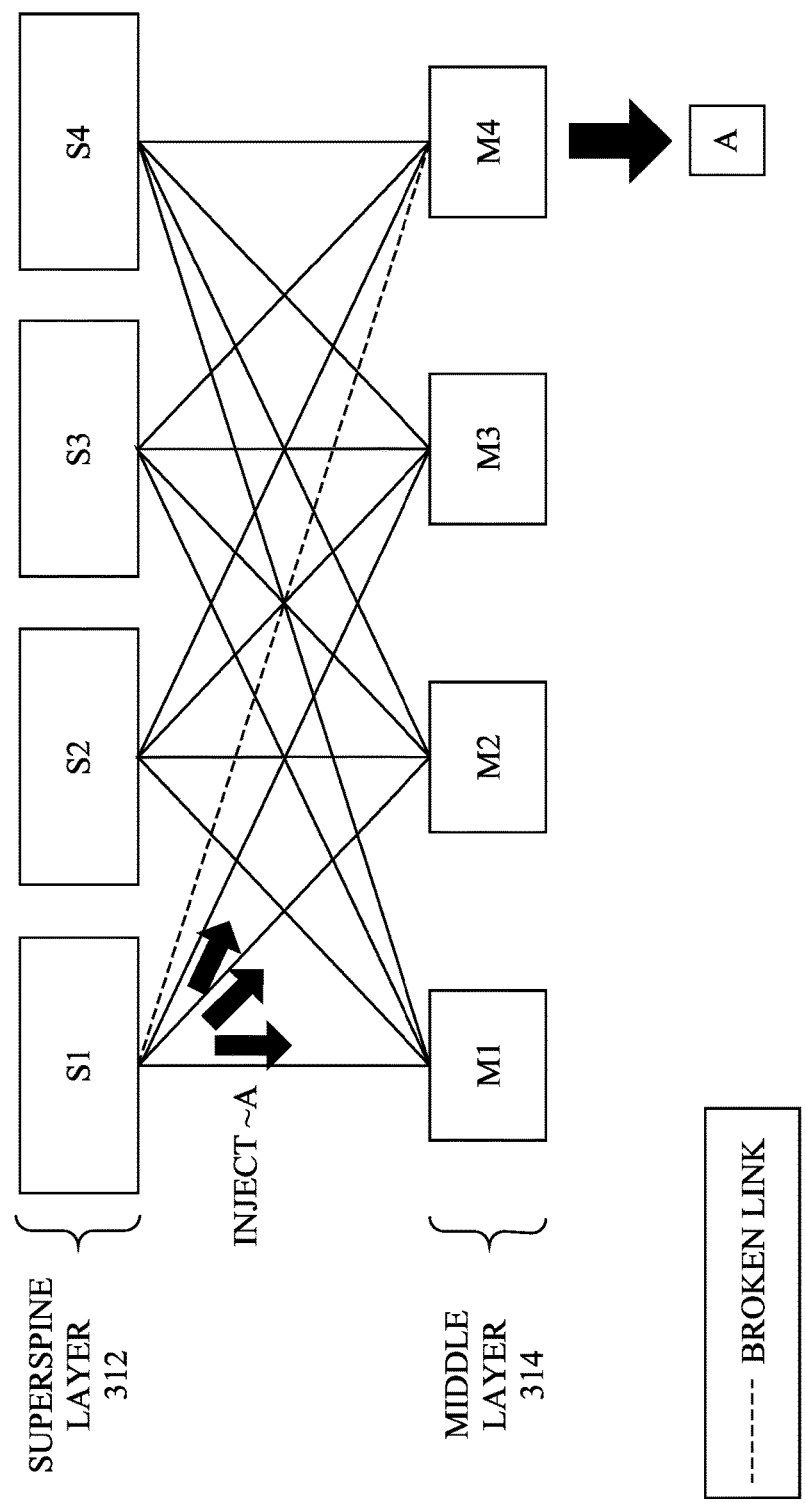

For example, as shown in example 420 in FIG. 4C, assume again that prefix A is unreachable from S1 due to a broken link. Assume further that S1 figures that prefix A exists and is not reachable. As a consequence, S1 injects a new negative route to all of its children, causing them to install a route to A via all of their parents for which they did not receive a negative route to A (e.g., parents S2-S4 shown). In such a case, only three messages are needed, instead of twelve for the same route information.

When the ToF is not partitioned, the collective southern flooding of the positive disaggregation by the ToF nodes that can still reach the impacted prefix is generally enough to cover all the switches at the next level south, typically the ToP nodes. If all of those switches are aware of the disaggregation, they collectively create a ceiling that intercepts all the traffic north and forwards it to the ToF nodes that advertised the more specific route. In that case, the positive disaggregation alone is sufficient to solve the fallen leaf problem.

On the other hand, when the fabric is partitioned in planes, the positive disaggregation from ToF nodes in different planes do not reach the ToP switches in the affected plane and cannot solve the fallen leaves problem. In other words, a breakage in a plane can only be solved in that plane. Also, the selection of the plane for a packet typically occurs at the leaf level and the disaggregation must be transitive and reach all the leaves. In that case, negative disaggregation is necessary.

Figure 4D:
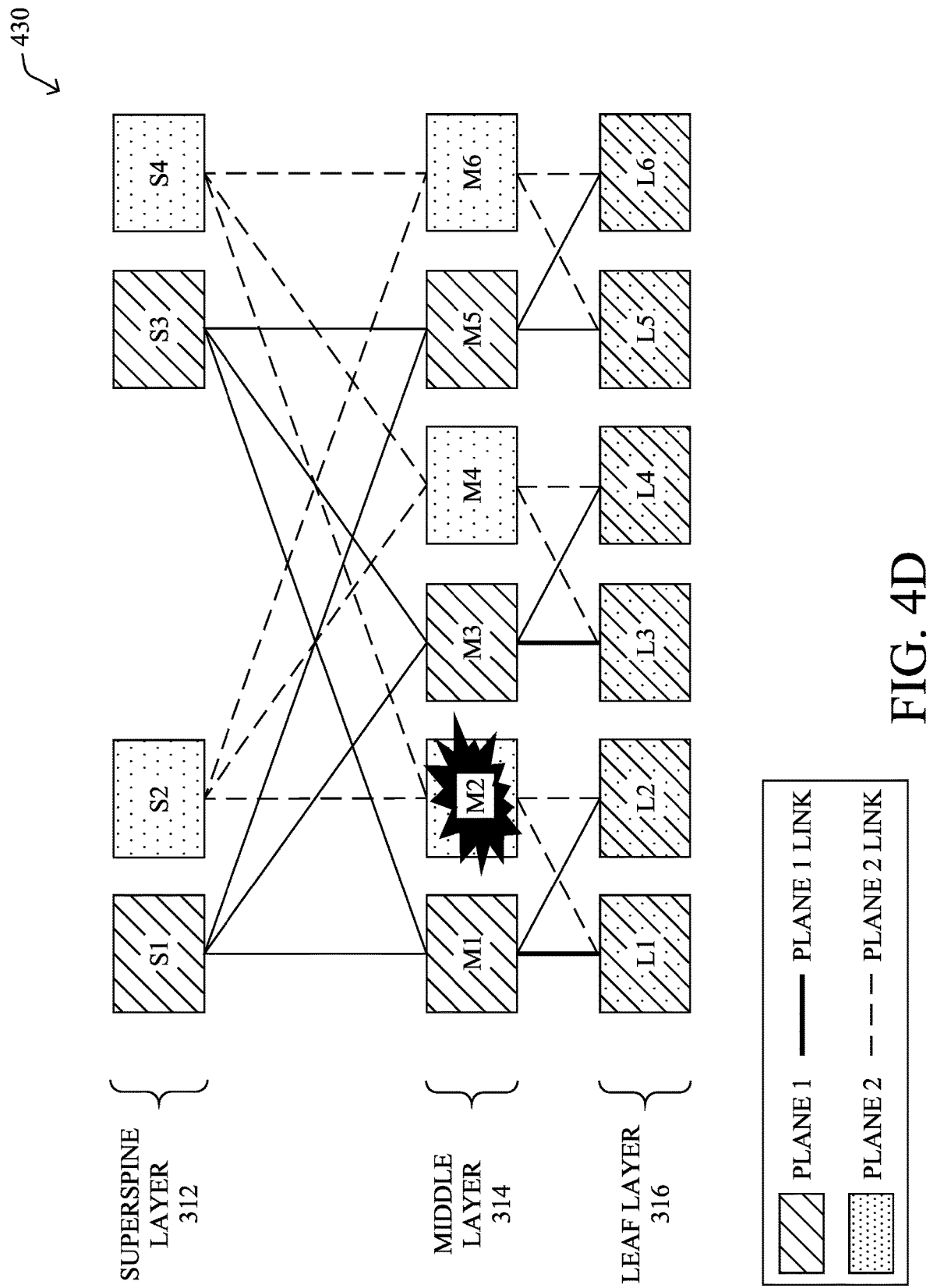

By way of example of the challenges with fallen leaves in partitioned fabrics, consider the case shown in FIG. 4D. As shown, assume that M2 in fabric 430 experiences a failure and that fabric 430 is partitioned into two planes: plane 1 and plane 2, with M2 belonging to the latter plane. In such a case, positive disaggregation from the nodes in superspine layer 312 belonging to plane 1 do not reach the nodes in middle layer 314 belonging to plane 2, meaning that positive disaggregation cannot be used to reconnect fallen leaf L2.

Preventing Damage to Flows in an SDN Fabric by Predicting Failures Using Machine Learning The techniques herein introduce a machine learning-based approach to predicting failures in an SDN fabric. Once a failure is predicted, the techniques further propose performing stepwise disaggregation in the fabric, to move the most important traffic around the predicted failure. In some aspects, the amount of traffic moved, as well as their associated measures of criticality, can be based on the likelihood of the predicted failure occurring.

Specifically, in various embodiments, a supervisory device for a software defined networking (SDN) fabric predicts a failure in the SDN fabric using a machine learning-based failure prediction model. The supervisory device identifies a plurality of traffic flows having associated leaves in the SDN fabric that would be affected by the predicted failure. The supervisory device selects a subset of the identified plurality of traffic flows and their associated leaves. The supervisory device disaggregates routes for the selected subset of traffic flows and their associated leaves, to avoid the predicted failure.

Illustratively, the techniques described herein may be performed by hardware, software, and/or firmware, such as in accordance with the flow management process 248 which may include computer executable instructions executed by the processor 220 (or independent processor of interfaces 210) to perform functions relating to the techniques described herein.

Figure 5:
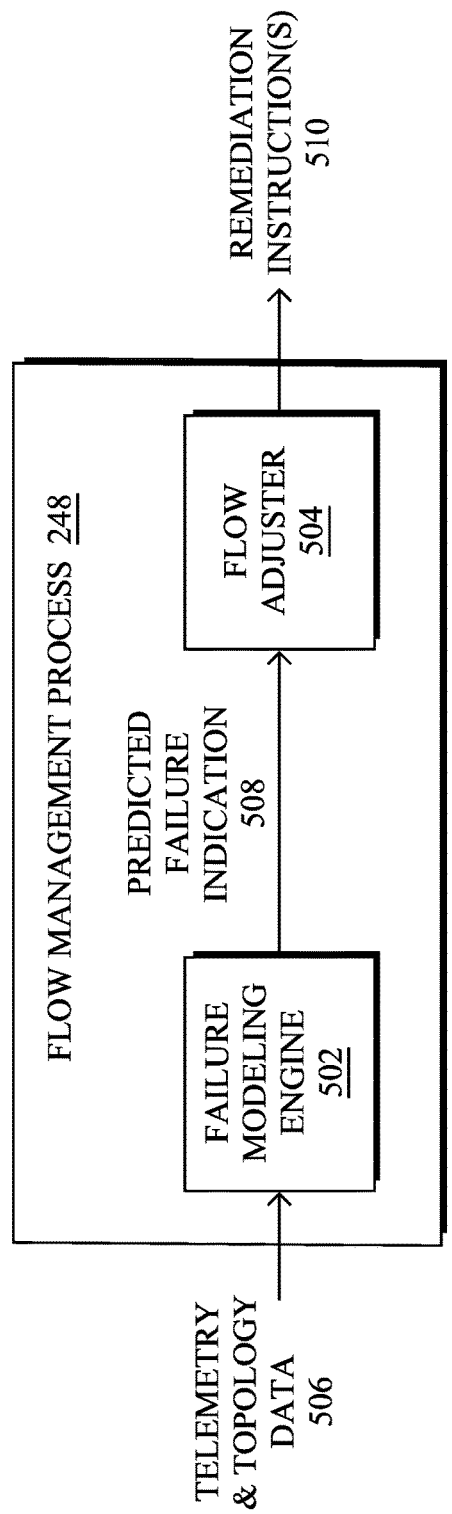
FIG. 5 illustrates an example architecture for preventing damage to traffic flows in an SDN fabric.

Operationally, FIG. 5 illustrates an example architecture 500 for preventing damage to traffic flows in an SDN fabric, according to various embodiments. At the core of architecture 500 may be flow management process 248 that may be executed by a device associated with an SDN fabric (e.g., device 200 described previously), such as a ToF node or other device in communication therewith. As shown, flow management process 248 may include the following components: a failure modeling engine 502 and a flow adjuster 504. These components 502-504 may be implemented in a distributed manner or implemented as their own stand-alone services, either as part of the network under observation or as a remote service. In addition, the functionalities of the components of architecture 500 may be combined, omitted, or implemented as part of other processes, as desired.

As would be appreciated, convergence time in an SDN fabric is of the utmost importance. Although fabric topologies tend to have simple symmetrical connectivity, switches and pods within the fabric may use a plethora of routing protocols, making the issue of fast convergence extremely challenging. Notably, at the speed of tens of Gbits/s, the failure of a link or node in the fabric will unavoidably lead to the fabric dropping a massive amount of traffic.

According to various embodiments, failure modeling engine 502 may be in charge of building and using predictive failure models for each component of the fabric. Such models may use machine learning, to predict where, and potentially when, a failure will occur in the SDN fabric.

To correctly make failure predictions, failure modeling engine 502 may obtain topology information regarding the fabric, as well as telemetry data 506 indicative of state changes of links and/or nodes in the fabric (e.g., up vs. down), either on a push or pull basis from the fabric. For example, failure modeling engine 502 may request and receive the local logs from routers, redirects of SNMP traps, or the like.

In one embodiment, the telemetry data in data 506 may be limited to state changes (e.g. link UP/DOWN), augmented with a set of variables specific to the network gear to model. For example, link attributes may include, but are not limited to, any or all of the following: link speed, underlying technologies (e.g. SDH, Leased Line, ADSL, ATM links, optical, etc.), the service provider providing the service, or any other link information, along with their associated timestamps. Further information that can be used by the model include the routing table information from the ToF nodes and the ECMP policies at the leaves. With that information, the model can determine where each flow will be routed and determine whether to update the ECMP rules of the leaves, to exclude certain parents for certain flows.

In another embodiment, state changes reported via data 506 may be triggered by link load threshold crossings or other similar variables such as the queue length, packet drop rates, or the like. Data 506 may also include environmental information, if available, such as the temperature of the room, temperature, switch location (e.g., rack Nb, position, etc.), output (V, A) of the power supplies, as well as logical information, such as buffer space and shared memory occupancy, COU load, etc. Indeed, the notion of failure can also be extended to link SLA degradation, such as an abnormal packet drop rates for a given links. Such telemetry may be requested on demand by failure modeling engine 502 to local nodes or any other SDN or NMS system using customized API extensions.

Prototyping of failure modeling engine 502 has demonstrated that time-series centric machine learning approaches, such as XGBOOST using gradient boosted trees, are particularly well suited for predicting failures in an SDN fabric, after clustering based on link type. Notably, link failure profiles are likely to vary with link layer attributes, meaning that different models may be constructed for different types of networking gear. Alternatively, the link type itself can be used as input to the model as an input feature. Said differently, a first step performed by failure modeling engine 502 would be to cluster link type by degree of similarity and then build a model specific to the cluster. In various embodiments, as detailed below, the precision/recall characteristics of the model can then be used by flow adjuster 504 to determine the remediation action triggered by the prediction of a failure in the fabric.

When a model of failure modeling engine 502 predicts a failure of a link or node in the SDN fabric, it may send an indication 50$ of the predicted failure to flow adjuster 504, according to various embodiments. In turn, flow adjuster 504 may determine a remediation action to be taken and issue one or more remediation instructions 510 to the fabric, while also taking into account the disruptiveness of proactively rerouting flows in the fabric before the predicted failure occurs. To illustrate this point, the 'degenerated network' refers herein to the remaining network/fabric with the predicted failed component removed and traffic has been rerouted around the removed component.

For each link $L_i$, flow adjuster 504 may compute the degenerated network $N(L_i)$, where link congestion levels are computed after rerouting the traffic that used to be carried out on the failed component. In such a case, let $I(L_i)$ represent the measured impact on $N(L_i)$. In other words, $I(L_i)$ represents the impact of flow adjuster 504 proactively rerouting traffic around a link or node that failure modeling engine 502 predicted to fail with a given probability of failing. Such a probability is given by the precision-recall curve for the model of failure modeling engine 502 that predicted the failure. Similarly, flow adjuster 504 may measure $N(L_i)$ by observing the impact on all links of the network due to the proactive rerouting of the traffic carried out on $N(L_i)$. For example, flow adjuster 504 may compute the Kolmogorov distance (e.g., the maximum distance between the cumulative distribution function (CDF) of link loads of the network). If the impact on $N(L_i)$ is below a maximum Kolmogorov distance, flow adjuster 504 may adjust the flows, accordingly.

Another factor that flow adjuster 504 may consider when attempting to mitigate the impact of a predicted failure is the probability of the model of failure modeling engine 502 issuing a false positive. In other words, it is almost always statistically possible for the model to incorrectly predict a failure that never actually occurs. Because of this, in various embodiments, flow adjuster 504 may only opt to reroute a subset of the traffic flows that would be affected by the predicted failure. Flow adjuster 504 may select such a subset, for example, based on their associated measures of criticality. In other words, flow adjuster 504 may only reroute the most critical flows around the predicted failure that require continuous service. In addition, flow adjuster 504 may select the number of flows in the subset to be rerouted based on the false positive estimation for the model that predicted the failure.

By way of example, assume that the recall of a failure prediction model is 0.4, where the recall is equal to the true positives divided by the SLIM of true positives and false negatives. In addition, assume that the model has a precision of 0.95, computed as the true positives of the model divided by the sum of true and false positives of the model. In such a case, this means that 40% of the failures predicted by the model are predicted with a precision of 95%. Conversely, if a higher recall is required, this would translate to a higher false positive rate, meaning more proactive reroutes at the risk of more false positives (e.g., unnecessary reroutes that could potentially cause congestion along alternate paths). Accordingly, in one embodiment, flow adjuster 504 may only proactively reroute traffic flows around a predicted failure if the impact $I(L_i)$, as measured by the Kolmogorov distance between the CDF of link loads on $N(L_i)$ is below a given threshold and the precision of the prediction model is also above a defined threshold.

In another embodiment, if the model of failure modeling engine 502 is also capable of forecasting both the time of failure, as well as its expected duration, e.g., $E(f(L_i))$, flow adjuster 504 may also take this duration into account when identifying flows to reroute, if any.

In a further embodiment, after the expiration of a time threshold T2 following the time of the predicted failure, if the link $L_i$ for which a failure was predicted is still active, the data plane may trigger a reverse rerouting operation. In such an action, traffic may be rerouted back onto the link that was predicted by failure modeling engine 502 as failing. Flow adjuster 504 can test whether the link is still active thanks to fast probing. Such a mechanism may allow for the quick detection of a false positive by failure modeling engine 502, which may be highly beneficial if the expected failure duration $E(f(L_i))$ is to higher than another given threshold. When flow adjuster 504 detects a false positive thanks to active probing of the fabric, it may notify failure modeling engine 502 of the false positive, potentially with the variables used by the model, to trigger retraining of the model by failure modeling engine and continually improving its precision-recall curve.

While the above techniques are described primarily with respect to link failures, they can also be generalized for node/device failures, as well. For example, a node/device in the fabric may have its own failure prediction model and, if a failure is predicted, remediation may entail treating the set of links of the node/device as failed, for purposes of rerouting at least a portion of the traffic on those links.

Figure 6A:
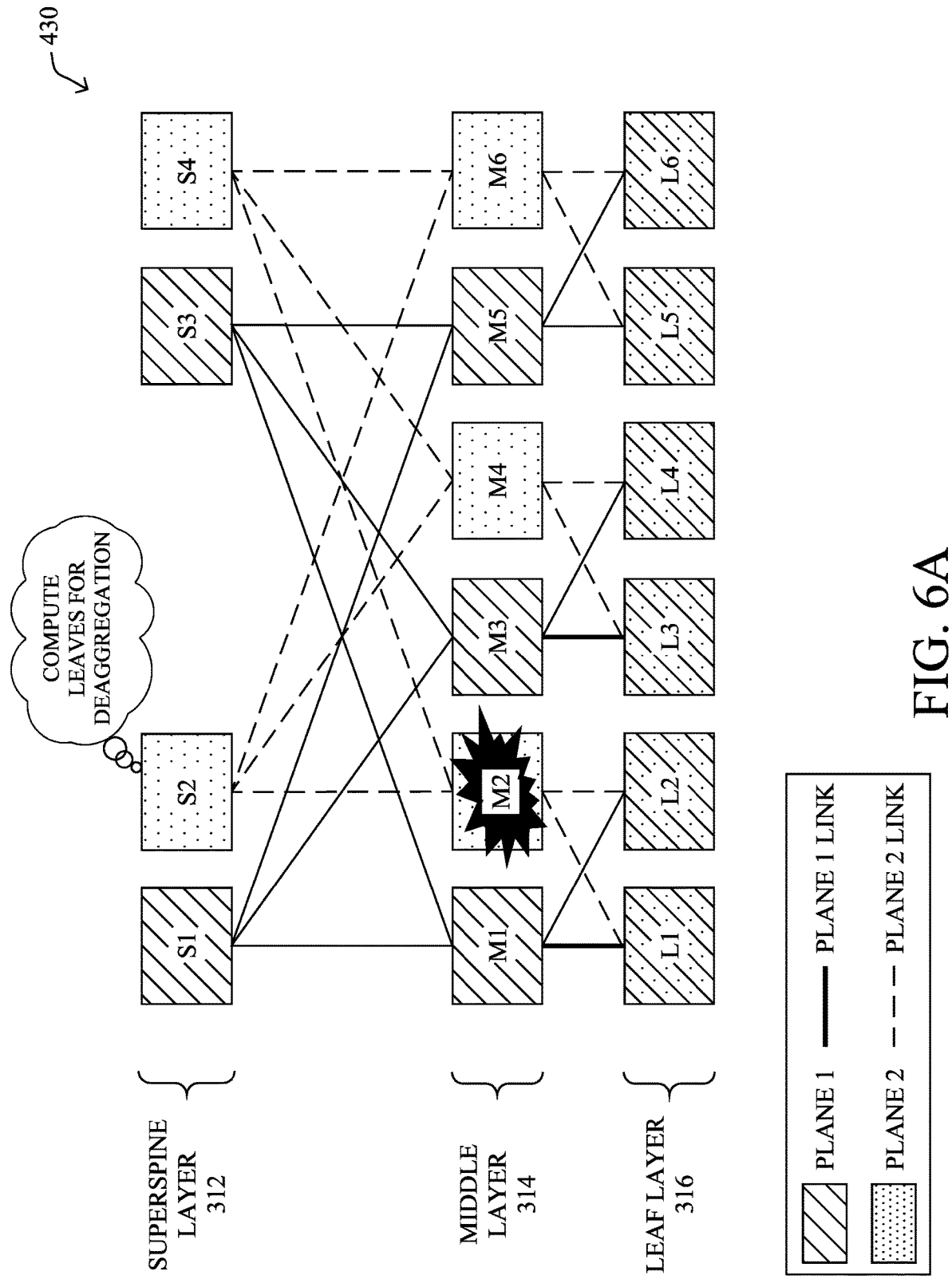
FIGS. 6A-6B illustrate an example of preventing damage to traffic flows in an SDN fabric.
Figure 6B:
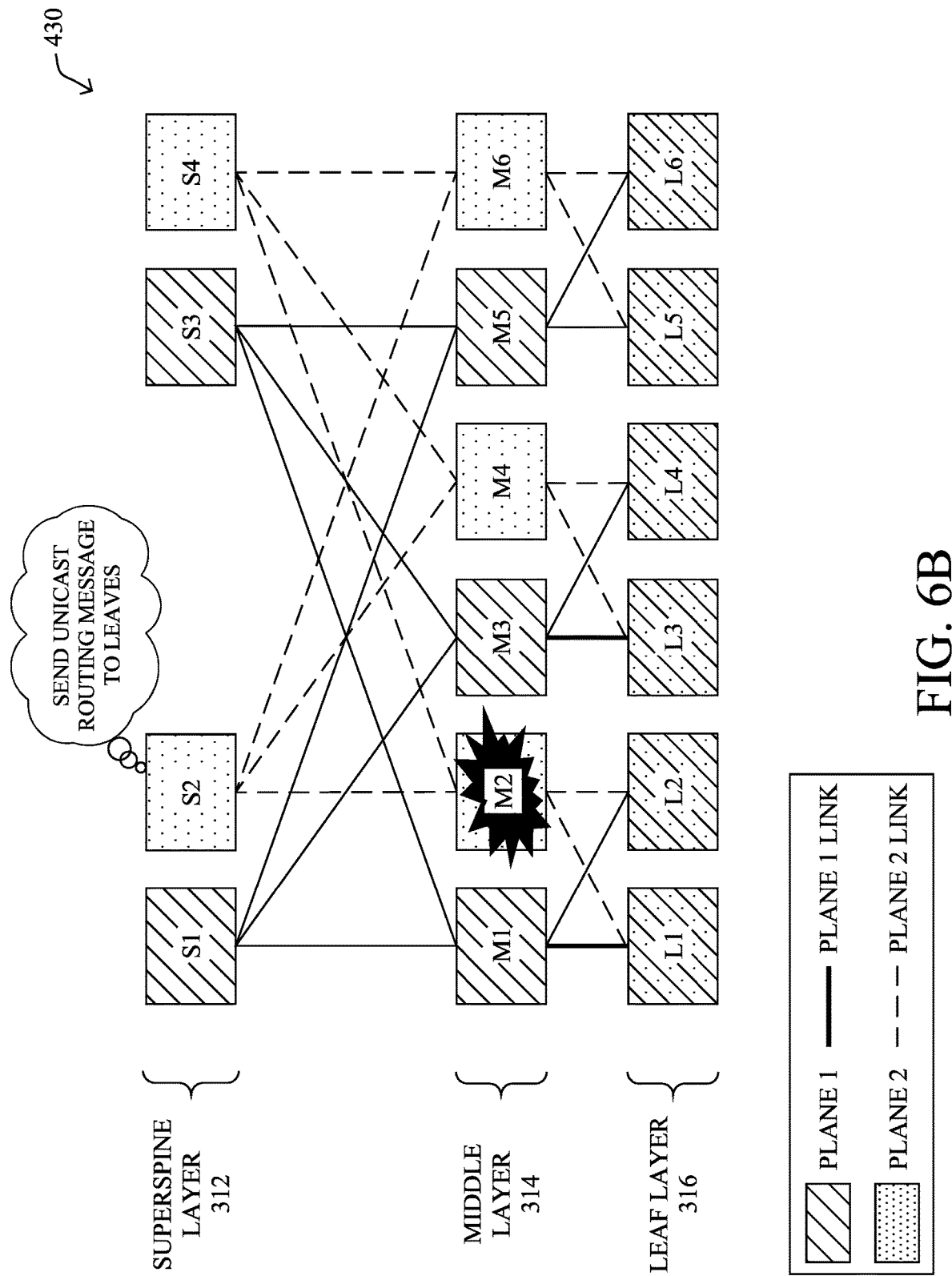

FIGS. 6A-6B illustrate an example of preventing damage to traffic flows in an SDN fabric, according to various embodiments. Continuing the previous breakage example of FIG. 4B, assume that fabric 430 is partitioned into two planes for purposes of illustration. As would be appreciated, the fabric may be partitioned into any number of planes, in a real-world deployment.

According to various embodiments, when a failure is predicted using the techniques herein, the impact of the predicted breakage can be mitigated by performing the following:
1. Sorting current flows that flow via the impacted router by criticality and by leaf.
2. Computing an amount of flows that can be rerouted based on the current state of the fabric. This can be done analytically or using learning machines, in various embodiments,
3. Selecting a number of leaves that are ingress nodes for the most critical flows.
4. Disaggregating the routes for those flows and leaves to enforce the use of parents/planes that avoid the breakage.

Steps 1 and 3 above are relatively straightforward and can be performed analytically, are straightforward to do analytically. Step 2 above is also relatively straightforward, from an analytics standpoint, but can also be performed by training machine learning models to make the computation.

Applying the above techniques to fabric 430, assume that S1 in superspine layer 312, or another device in communication therewith, is configured to perform the prediction and remediation techniques above. Further, assume that M2 in middle layer 314 has not failed yet, but that the machine learning-based model of S1 predicts that M2 is about to fail, based on the telemetry data regarding this node. In such a case, S2 may determine that M2 is the only way in plane 2 to reach leaves L1 and L2 in leaf layer 316 and all corresponding flows would be affected if M2 fails.

Assume now that the most critical flows that could be affected by failure of M2 enter fabric 430 via leaves L4 and L5. In addition to these flows, S2 also identifies flows that would be affected that are L3 and L6 and ECMP routed over plane 2, but these are less critical. In addition, moving them, too, may destabilize the fabric and augment the risk of blocking.

Based on the predicted failure of M2 and the identification of the most critical flows that would be affected, S2 (or a separate controller) may compute a partial list of leaves that will be disaggregated. In turn, as shown in FIG. 6B, S2 may send a unicast routing message straight to the selected leaves, L4 and L5, indicating that plane 2 is to be avoided. Such a routing message may appear similar to a RIFT negative disaggregation. However, rather than performing a single hop flooding, S2 may send the unicast routing message all the way from superspine layer 312 (ToF) to the selected leaves in leaf layer 316.

S2 may also assess whether M2 actually fails within the predicted amount of time. If the failure does not occur, S2 may remove the reroute. Conversely, if the failure does occur, S2 may perform disaggregation of the other leaves affected by the failure, as well (e.g., L3 and L6).

In some embodiments, the unicast message may also indicate the specific flows that are to be rerouted. For example, if the affected leaves are also able of performing per-flow routing, this would allow those leaves to only reroute the selected flows away from plane 2 and using ECMP over the other planes.

By disaggregating the leaves associated with the most critical flows that could be affected by the failure of M2, this effectively hedges the bet against a false positive. In some embodiments, based on the state of fabric 430, it may also make sense for S2 to disaggregate plane 2 for leaves L1 and L2, as well. However, the additional load may also destabilize fabric 430. If that is the case, S2 may disaggregate only those leaves associated with the most critical flows impacted by the predicted failure.

Note that while a leaf in the SDN fabric is typically the location at which the rerouting action takes place, other implementations provide for plane decisions or ToF decisions to be made elsewhere in the fabric. For example, in further embodiments, this could also be performed at a Top of Pod node that is told to avoid a superspine node that is about to be disconnected (e.g., because the ToF may reboot or the network adapter is giving signs of failure, the level of transmit/receive errors over the fiber is rising, etc.). Said differently, in the more general sense, the techniques herein can be used to signal a disaggregation message to any node in the fabric that causes it to exclude one of its parents for purposes of rerouting around a predicted failure.

Figure 7:
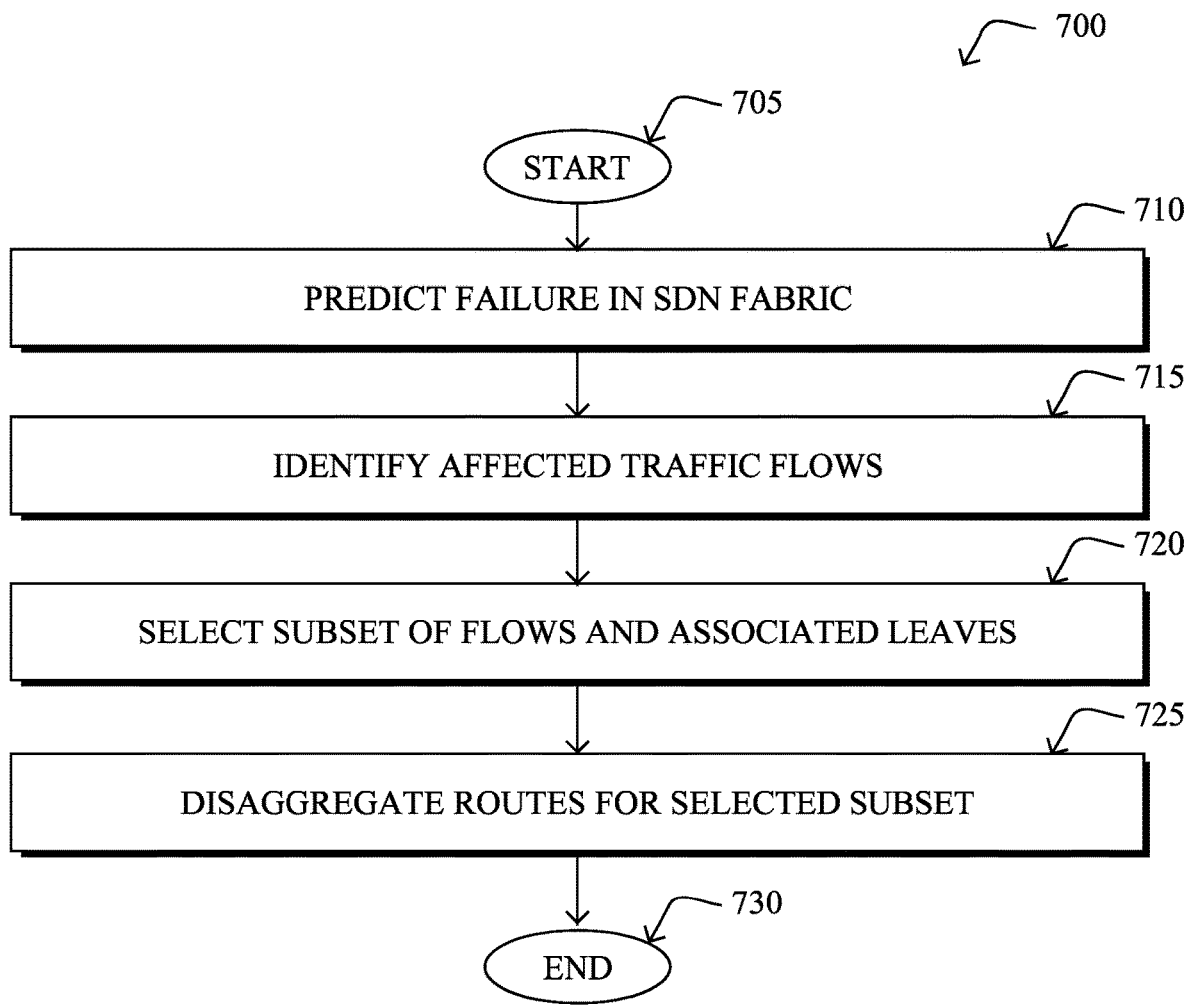
FIG. 7 illustrates an example simplified procedure for preventing damage to traffic flows in an SDN fabric.

FIG. 7 illustrates an example simplified procedure for preventing damage to traffic flows in an SDN fabric, in accordance with one or more embodiments described herein. For example, a non-generic, specifically configured supervisory device for the fabric (e.g., device 200) may perform procedure 700 by executing stored instructions (e.g., process 248). The procedure 700 may start at step 705, and continues to step 710, where, as described in greater detail above, the supervisory device predicts a failure in the SDN fabric using a machine learning-based failure prediction model. In various cases, the failure may be for a particular link in the fabric or for a particular node, based on telemetry data obtained by the supervisory device regarding the link or node. For example, if the supervisory device is a ToF node in the fabric, it may poll other nodes in the fabric for the telemetry data for purposes of predicting failures.

At step 715, as detailed above, the supervisory device may identify a plurality of traffic flows having associated leaves in the SDN fabric that would be affected by the predicted failure. For example, the supervisory device may identify leaves in the fabric that the traffic flows flowing through the predicted point of failure enter the fabric.

At step 720, the supervisory device may select a subset of the identified plurality of traffic flows and their associated leaves, as described in greater detail above. In one embodiment, the supervisory device may do so by computing a size of the subset based on a number of the affected traffic flows that can be rerouted based on a current state of the SDN fabric and, in turn, populating the subset with traffic flows from the plurality based on their associated measures of criticality. In other words, the supervisory device may only select the most critical flows that could be affected by the predicted failure, based on the ability of the rest of the fabric to accommodate additional traffic. In further embodiments, the supervisory device may select the subset of flows based in part on the false positive rate of the failure prediction model. Indeed, the supervisory device may hedge against rerouting all flows that could be affected by the failure, when no such failure actually occurs.

At step 725, as detailed above, the supervisory device may disaggregate routes for the selected subset of traffic flows and their associated leaves, to avoid the predicted failure. In some embodiments, the supervisory device may do so by sending a unicast routing message to one of the leaves associated with one or more of the flows in the subset, to cause that leaf to reroute the one or more traffic flows to a different plane partition of the SDN fabric. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a prediction mechanism for predicting failures in an SDN fabric. In addition, the techniques herein recognize that, due to a large number of ECMP alternates and numbers of planes and superspine nodes in a typical SDN fabric, a limited number of individual flows (or all flows injected at a particular leaf) can be temporarily rerouted to avoid a particular fabric router associated with the failure, without critically impacting the fabric.

While there have been shown and described illustrative embodiments that provide for preventing damage to flows in an SDN fabric, it is to be understood that various other adaptations and modifications may be made within the spirit and scope of the embodiments herein. For example, while certain embodiments are described herein with respect to using certain models for purposes of predicting failures, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
predicting, by a supervisory device for a software defined networking (SDN) fabric, a failure in the SDN fabric using a machine learning-based failure prediction model;
identifying, by the supervisory device, a plurality of traffic flows having associated leaves in the SDN fabric that would be affected by the predicted failure;
selecting, by the supervisory device, a subset of the identified plurality of traffic flows and associated leaves of the subset of the identified traffic flows;
identifying, by the supervisory device, critical traffic flows which require continuous service among the selected subset of traffic flows; and
disaggregating, by the supervisory device, routes only for the critical traffic flows and associated leaves of the critical traffic flows, to avoid the predicted failure.

2. The method as in claim 1, wherein predicting the failure in the SDN fabric comprises:
using link telemetry data regarding links in the SDN fabric as input to the failure prediction model.

3. The method as in claim 1, wherein selecting the subset of the identified plurality of traffic flows and associated leaves of the subset of the identified traffic flows comprises:
computing a size of the subset based on a number of the affected traffic flows that can be rerouted based on a current state of the SDN fabric; and
populating the subset with traffic flows from the plurality based on their associated measures of criticality.

4. The method as in claim 1, wherein the subset of the identified plurality of traffic flows is selected based in part on a false positive rate of the failure prediction model.

5. The method as in claim 1, wherein disaggregating routes only for the critical traffic flows and associated leaves of the critical traffic flows, to avoid the predicted failure, comprises:
sending a unicast routing message to a leaf associated with one or more of traffic flows of the critical traffic flows, to cause that leaf to reroute the one or more traffic flows to a different plane partition of the SDN fabric.

6. The method as in claim 5, wherein the supervisory device is a top of fabric device in the SDN fabric.

7. The method as in claim 5, wherein the unicast routing message identifies the one or more traffic flows, and wherein the leaf receiving the unicast routing message is configured to reroute those flows on a per-flow basis.

8. The method as in claim 1, wherein the failure prediction model is configured to predict a timeframe associated with the predicted failure, and wherein the subset of traffic flows is selected based in part on the predicted timeframe associated with the predicted failure.

9. An apparatus, comprising:
one or more network interfaces to communicate with a software defined networking (SDN) fabric;
a processor coupled to the network interfaces and configured to execute one or more processes; and
a memory configured to store a process executable by the processor, the process when executed configured to:
predict a failure in the SDN fabric using a machine learning-based failure prediction model;

identify a plurality of traffic flows having associated leaves in the SDN fabric that would be affected by the predicted failure;

select a subset of the identified plurality of traffic flows and associated leaves of the subset of the identified traffic flows;

identifying, by the supervisory device, critical traffic flows which require continuous service among the selected subset of traffic flows; and disaggregate routes only for the critical traffic flows and associated leaves of the critical traffic flows, to avoid the predicted failure.

10. The apparatus as in claim 9, wherein the apparatus predicts the failure in the SDN fabric comprises:

using link telemetry data regarding links in the SDN fabric as input to the failure prediction model.

11. The apparatus as in claim 9, wherein the apparatus selects the subset of the identified plurality of traffic flows and associated leaves of the subset of the identified traffic flows by:

computing a size of the subset based on a number of the affected traffic flows that can be rerouted based on a current state of the SDN fabric; and populating the subset with traffic flows from the plurality based on their associated measures of criticality.

12. The apparatus as in claim 1, wherein the subset of the identified plurality of traffic flows is selected based in part on a false positive rate of the failure prediction model.

13. The apparatus as in claim 9, wherein the apparatus disaggregates routes only for the critical traffic flows and associated leaves of the critical traffic flows, to avoid the predicted failure, by:

sending a unicast routing message to a leaf associated with one or more of traffic flows of the critical traffic flows, to cause that leaf to reroute the one or more traffic flows to a different plane partition of the SDN fabric.

14. The apparatus as in claim 13, wherein the apparatus disaggregates routes for the selected subset of traffic flows and associated leaves, to avoid the predicted failure, by:

sending a unicast routing message to a node in the fabric associated with one or more of the traffic flows in the selected subset, to cause that node to reroute the one or more traffic flows to a different parent of the node.

15. The apparatus as in claim 13, wherein the unicast routing message identifies the one or more traffic flows, and wherein the leaf receiving the unicast routing message is configured to reroute those flows on a per-flow basis.

16. The apparatus as in claim 9, wherein the failure prediction model is configured to predict a timeframe associated with the predicted failure, and wherein the subset of traffic flows is selected based in part on the predicted timeframe associated with the predicted failure.

17. A tangible, non-transitory, computer-readable medium storing program instructions that cause a supervisory device for a software defined networking (SDN) fabric to execute a process comprising:

predicting, by the supervisory device for the SDN fabric, a failure in the SDN fabric using a machine learning-based failure prediction model;

identifying, by the supervisory device, a plurality of traffic flows having associated leaves in the SDN fabric that would be affected by the predicted failure;

selecting, by the supervisory device, a subset of the identified plurality of traffic flows and associated leaves of the subset of the identified traffic flows;

identifying, by the supervisory device, critical traffic flows which require continuous service among the selected subset of traffic flows; and disaggregating, by the supervisory device, routes only for the critical traffic flows and associated leaves of the critical traffic flows, to avoid the predicted failure.

18. The computer-readable medium as in claim 17, wherein predicting the failure in the SDN fabric comprises:

using link telemetry data regarding links in the SDN fabric as input to the failure prediction model.

19. The computer-readable medium as in claim 17, wherein disaggregating routes for the selected subset of traffic flows and associated leaves of the subset of the identified traffic flows, to avoid the predicted failure, comprises:

sending a unicast routing message to a leaf associated with one or more of the traffic flows in the selected subset.

20. The computer-readable medium as in claim 17, wherein the supervisory device is a top of fabric device in the SDN fabric.

* * * * *

UNITED STATES PATENT AND TRADEMARK OFFICE
CERTIFICATE OF CORRECTION

| | |
|---|---|
| PATENT NO. | : 10,812,388 B2 |
| APPLICATION NO. | : 16/269723 |
| DATED | : October 20, 2020 |
| INVENTOR(S) | : Pascal Thubert et al. |

It is certified that error appears in the above-identified patent and that said Letters Patent is hereby corrected as shown below:

In the Specification

In Column 12, Line 1, please amend as shown:
indication 508 of the predicted failure to flow adjuster 504

In Column 12, Line 49, please amend as shown:
positives divided by the sum of the true positives and false In Column 13, Line 13, please amend as shown:
duration $E-f-L_i$)) is higher than another given threshold.

Signed and Sealed this
Twenty-ninth Day of December, 2020

Andrei Iancu
*Director of the United States Patent and Trademark Office*